Dec. 22, 1936. W. F. OLIVER ET AL 2,065,018
HYDRAULIC BRAKE SYSTEM
Filed July 11, 1932 2 Sheets-Sheet 1
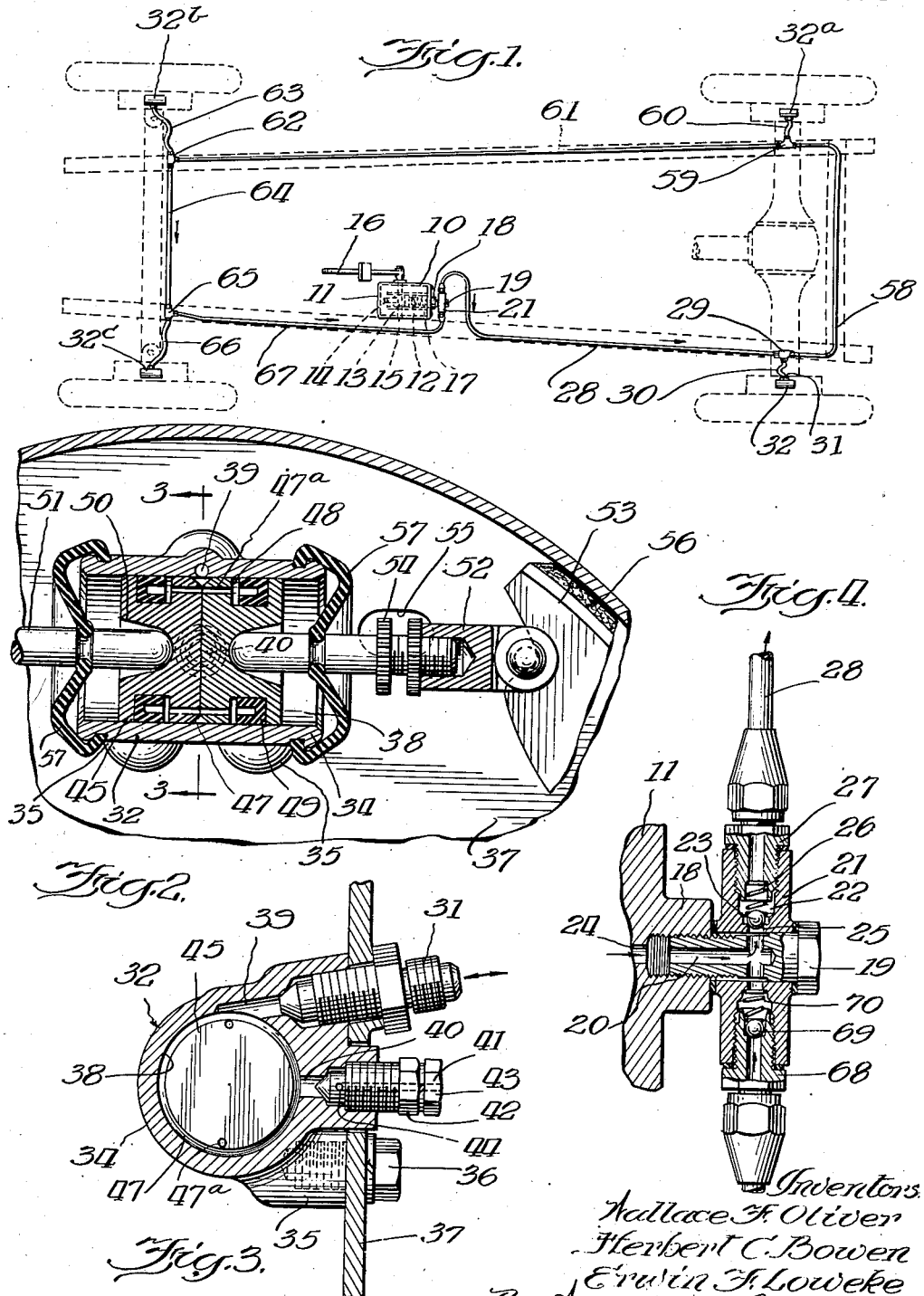
Inventors.
Wallace F. Oliver
Herbert C. Bowen
Erwin F. Loweke

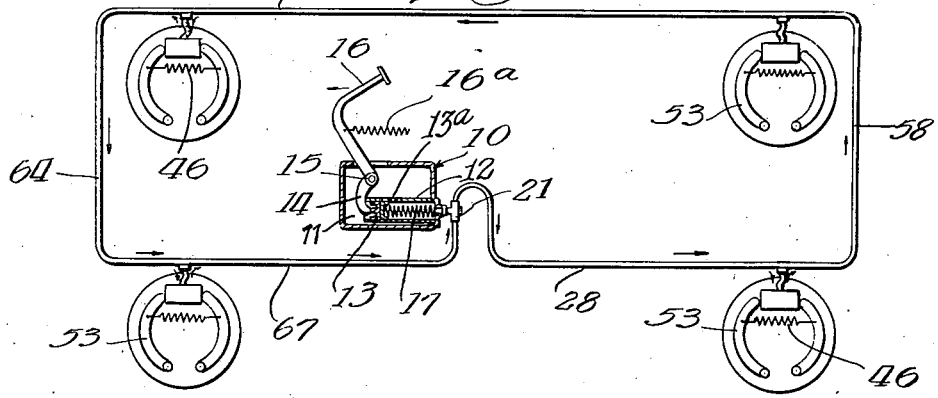
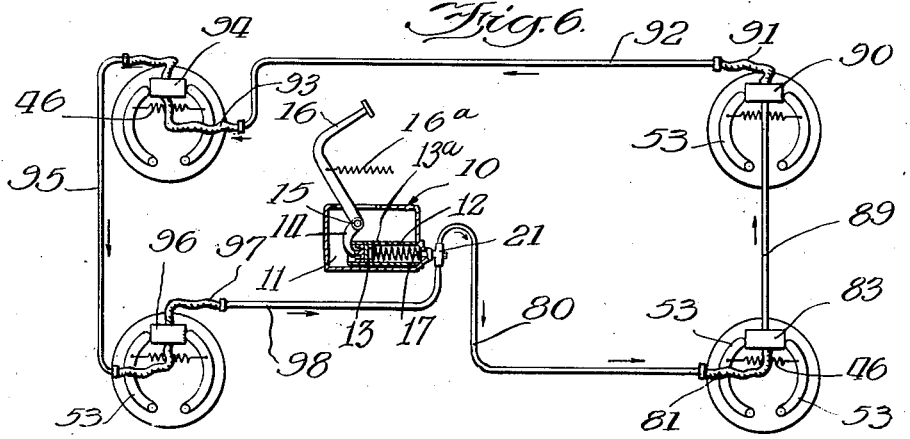
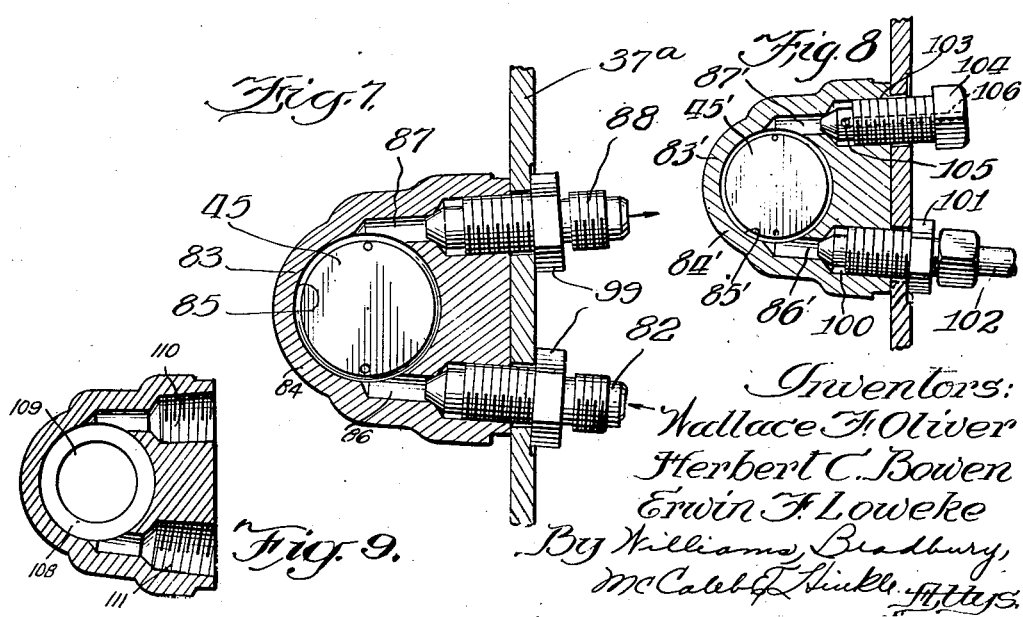

Patented Dec. 22, 1936

2,065,018

UNITED STATES PATENT OFFICE 2,065,018

HYDRAULIC BRAKE SYSTEM

Wallace F. Oliver, Herbert C. Bowen, and Erwin F. Loweke, Detroit, Mich., assignors to Hydraulic Brake Company, Detroit, Mich., a corporation of California Application July 11, 1932, Serial No. 621,906

23 Claims. (Cl. 188—152)

Our invention pertains to hydraulic brake systems and is particularly concerned with an improved hydraulic brake system for automotive vehicles, although certain features of our invention are capable of application in other fields.

In hydraulic brake systems it is of the utmost importance that the conduits, wheel cylinders and master cylinder be completely filled with an incompressible body of liquid for transmitting without loss the pressure applied on the foot pedal to the brake shoes at the vehicle wheels. It sometimes happens in brake systems which have been used over long periods of time that the sealing means at the wheel cylinders becomes worn to such an extent as to permit minute quantities of air to leak past the pistons at the wheel cylinders. These quantities of air are usually so small that they will not affect the operation of the brake system if the brake system is designed promptly to cleanse itself of such quantities of air through the normal operation of the system.

Where the brakes of a vehicle are used extensively, particularly in extremely hot weather, the brake shoes, brake drum and wheel cylinders are heated to a comparatively high temperature, and in extreme conditions this temperature may reach such a point as to volatilize the brake fluid in the wheel cylinders and adjacent portions of the conduit system. Such volatilization of the brake fluid is undesirable as under certain circumstances it may seriously affect the operation of the brake system.

An object of our invention is to provide a new and novel brake system which will automatically cleanse itself of any air which may find its way into the system.

Another object is to provide a brake system which will facilitate cooling of the brake fluid.

Another object is to provide novel designs of wheel cylinders, wheel cylinder pistons, and conduit arrangements for carrying out the above-described objects.

Other objects and advantages will become apparent as the description proceeds.

In the drawings, Fig. 1 is a plan view of a part of the chassis of an automotive vehicle, showing one form of our brake system applied thereto;

Fig. 2 is a sectional elevation through one of the wheel cylinders, and shows some of the mechanism immediately adjacent the wheel cylinders;

Fig. 3 is a section taken on the line 3—3 of Fig. 2;

Fig. 4 is a sectional view through the valve mechanism mounted at the discharge end of the master cylinder;

Fig. 5 is a diagrammatic view of the embodiment of our invention shown in Fig. 1;

Fig. 6 is a diagrammatic view similar to Fig. 5, but showing a different embodiment of our invention;

Fig. 7 is a sectional view through one of the wheel cylinders used in the embodiment shown in Fig. 6;

Fig. 8 is a sectional view through a wheel cylinder which is identical with the wheel cylinder shown in Fig. 7 but illustrating a different application for such wheel cylinder, and Fig. 9 is a sectional view through a two-diameter wheel cylinder.

Referring first to that embodiment of our invention illustrated in Figs. 1 to 5, inclusive, we have shown the frame and running gear of a conventional automobile in dotted lines in Fig. 1. On this frame is mounted a combined master cylinder and reservoir unit 10 which may be of any conventional or desired type, but which preferably is generally similar to that disclosed in Malcolm Loughead and Erwin F. Loweke Patent No. 1,758,671, of May 13, 1930, except that the valve mechanism designated by the reference numerals 31 to 37, inclusive, in said patent, is omitted.

This master cylinder and reservoir unit comprises in general a fluid reservoir containing a master cylinder 12 having a piston 13 reciprocated by an arm 14 mounted on an oscillable shaft 15 which extends outside of the reservoir for connection with the usual brake pedal 16. The arm 14 has a separable connection with the piston 13, the latter being returned by a spring 17, whereas the brake pedal 16 is returned by a separate spring 16a (Fig. 5). When the piston 13 is in retracted position it uncovers a port 13a which provides free communication between the cylinder 12 and the interior of the reservoir 11. The rear end of the reservoir 11 is provided with a boss 18 into which is threaded a bolt 19 having a T-shaped conduit 20 bored therein.

A valve-carrying member 21 is clamped between the boss 18 and the head of the bolt 19. The member 21 has a valve chamber 22 containing a valve 23 which normally closes communication between the chamber 22 and the T-shaped conduit 20 in the bolt 19. The T-shaped conduit 20 is in open communication with the discharge end of the master cylinder 12 through the medium of passageway 24.

When the driver of the vehicle applies the brakes, the fluid discharged from the master cylinder forces the valve 23 away from its seat 25 against the tension of valve spring 26, and the fluid thus forced past the valve passes through tubular fitting 27 and thence into the conduit 28, which, in the present embodiment, is shown as extending rearwardly along the left-hand channel member of the vehicle frame to a T 29 located approximately over the rear axle of the vehicle.

A flexible hose 30 leads from the side outlet of the T 29 to inlet nipple 31 of wheel cylinder 32. This wheel cylinder is shown most clearly in Figs. 2 and 3, and includes a casting 34 having bosses 35 threaded to receive bolts 36 by means of which the wheel cylinder is affixed to the usual supporting pan 37. The casting 34 is provided with a cylindrical bore 38 which communicates with the nipple 31 by means of a passageway 39.

A second passageway 40 connects the cylinder bore with a bleeder screw 41 which may be of any conventional type but which, in the present instance, is shown as comprising a tubular sleeve 42 threaded into the casting 34, and a valve member 43 having a tapered inner end which in normal position closes the passageway 40.

When it is desired to bleed air out of the wheel cylinder the valve member 43 is unscrewed sufficiently to withdraw its tapered end from sealing engagement with the passageway 40, whereupon air may pass through the passageway 40, enter the cross openings 44, and thence into a passageway extending longitudinally of the valve member 43 which communicates with atmosphere.

While the pistons used in the wheel cylinder 32 may be of any conventional type, we preferably use pistons of the type indicated at 45 in Fig. 2. Such pistons have plane faces which are normally held in engagement by retractile springs 46 (Fig. 5). The plane faces of the pistons 45 merge into beveled surfaces 47 which form an annular groove for distributing fluid under pressure supplied to passageway 39.

It is to be understood that the abutting faces of the pistons are not machined so accurately as to prevent relatively free access of fluid between said faces, so that when fluid pressure is applied the fluid pressure acts over the entire faces of the pistons 45.

Each piston 45 is provided with an annular recess 48 in which is located a rubber ring 49, this rubber ring being U-shaped in cross-section. Each piston 45 is further provided with a tapered recess 50 for receiving one end of a piston rod 51, the other end of which has an adjustable threaded connection with a socket member 52 which in turn contacts with a brake shoe 53.

A coarse-toothed wheel 54 is associated with the piston rod 51 and the supporting pan 37 is provided with a suitably located opening 55, through which the end of a screw driver may be inserted to engage the toothed wheel 54 and thereby adjust the length of the piston rod to compensate for variations in thickness of the brake lining 56. Rubber boots 57 seal the ends of the cylinder 32 against the entry of dirt and moisture.

The rearward outlet of the T 29 is connected to a conduit 58 which continues along the side member of the vehicle frame to the nearest cross member and thence along this cross member to the opposite side of the frame, whence this conduit connects with a second T 59.

A flexible hose 60 connects the T 59 with a second wheel cylinder 32a which may be identical with the wheel cylinder 32 previously described. Conduit 61 connects T 59 with T 62 which in turn is connected to a third wheel cylinder 32b by a flexible hose 63.

T 62 is preferably located approximately at the point where a cross member connects the side members of the vehicle frame, and a conduit 64 extends along this cross member and connects T 62 with T 65, which in turn is connected to a fourth wheel cylinder 32c by a flexible hose 66. The wheel cylinders 32b and 32c may likewise be identical with the wheel cylinder 30 first described.

Conduit 67 connects T 65 with tubular nipple 68 (Fig. 4) threaded into the return side of the valve member 21. The tubular nipple 68 provides a seat for valve 69 which is normally held in engagement with said seat by a spring 70.

Under certain circumstances it may be desirable to maintain the annular grooves 48 in the pistons 45 in free communication with the conduit system, and for this purpose we have shown the pistons as provided with passageways 47a.

In the form of our invention shown in Figs. 1 to 5, inclusive, the conduits 28, 58, 61, 64 and 67 form a complete circuit. The fluid discharged from the master cylinder is forced past the valve 23 and into conduit 28, whence this fluid flows in the direction of the arrows toward the T 29. The check valve 69 prevents any of the fluid discharged by the master cylinder from flowing directly into the conduit 67.

When the pistons in the wheel cylinders are returned to their normal positions by retractile springs 46, the fluid returned to these conduits by the wheel cylinders tends to flow in the direction of the arrows and is forced past check valve 69 and thence returns to the master cylinder. The tendency thus is for the fluid to travel in a circular path, and the same fluid is not repeatedly forced into the wheel cylinders. The check valve 69 retains in the conduits and wheel cylinders a predetermined fluid pressure which prevents infiltration of air.

The pistons 45 are so designed that when the pistons are in the normal position shown in Fig. 2, there is a minimum of fluid left in the cylinder, so that during the return stroke of the pistons 45 practically all of the fluid which was in the cylinder when the brakes were applied is discharged by the return stroke of the wheel cylinder pistons.

It should also be pointed out that the flexible hoses which connect the wheel cylinders with the conduit system on the frame of the vehicle have at present an internal diameter of only one-eighth inch so that the volume of fluid retained in each hose is small compared to the capacity of its wheel cylinder, wherefore, upon each application of the brakes, several times the volume of fluid contained in a flexible hose is forced into and out of its associated wheel cylinder, thereby completely changing the fluid in the hose.

As previously pointed out, the brake shoes, brake drums, wheel cylinders, and associated parts, become hot during a long application of the brakes, and this heat is communicated to the fluid in the wheel cylinders, sometimes raising the temperature of this fluid to such an extent as to volatilize one of the constituents thereof. Upon a release of the brakes practically all of this hot fluid is discharged from the wheel cylinders into the conduits 58, 61, 64 and 67, which are ordinarily of copper and which facilitate rapid cooling of the fluid contained therein.

The fluid discharged by one wheel cylinder does not pass back into such wheel cylinder upon the next application of the brakes but moves on toward the next wheel cylinder in the circuit, but before the fluid just discharged from one wheel cylinder can reach the next wheel cylinder, such fluid will have to pass through a considerable length of relatively cool copper conduit, and in so travelling from one wheel cylinder to the next, the temperature of the fluid will be greatly reduced.

The closed conduit circuit on the frame of the vehicle is normally located above the wheel cylinders so that the flexible hoses lead upwardly from the wheel cylinders to these conduits. Therefore any air which may find its way into a wheel cylinder can travel upwardly through the flexible conduit and into the copper conduits on the vehicle frame. Upon the next application of the brakes these minute quantities of air will be advanced around the conduit circuit until they eventually reach the master cylinder, from whence they pass into the reservoir and thence to atmosphere. In this manner the system quickly clears itself of the air and maintains itself in a conduit of maximum efficiency. This automatic scavenging of air is also much facilitated by the particular design of wheel cylinders whereby practically all of the fluid and any air bubbles which may collect therein are discharged from the wheel cylinders during the return strokes of the wheel cylinder pistons.

In the normal operation of the wheel cylinder shown in Figure 3, any trifling amount of air which might leak into the cylinder during its normal use would be carried out of the cylinder by the fluid discharged therefrom by the return of the wheel cylinder pistons following each application of the brakes. When it is desired to bleed the system, the bleed screw 43 at one of the wheel cylinders is opened. During the bleeding operation, however, the wheel cylinder pistons remain idle and fluid is pumped into the wheel cylinder 38 rapidly through the inlet 39, thereby preventing escape of air through this inlet during the bleeding operation. The excess of fluid which is thus pumped into the wheel cylinder and any entrapped air either in this excess fluid or in the wheel cylinder itself is thus forced to escape through the open bleed screw.

In Figs. 6 and 7 we have shown a modification of our invention which concerns itself principally with the conduit arrangement and with the structure of the wheel cylinder casting. In this form of our invention we may utilize the same master cylinder and reservoir unit 10, the same brake pedal 16, return spring 16a, operating linkage, valve member 21, and arrangement of inlet and outlet valves therein, as has been described in connection with the previous embodiment.

The master cylinder discharges into a conduit 80 preferably formed of a copper tube attached to the frame of the vehicle and extending along one of the side members thereof to a point adjacent one of the rear wheels. A flexible hose 81 connects conduit 80 to the lower or inlet nipple 82 of wheel cylinder 83 formed by a casting 84 having a cylinder bore 85 therein provided with an inlet passage 86 and an outlet passage 87.

The pistons, piston rods and attendant mechanism, may be identical with that shown in Fig. 2. The outlet passageway 87 is provided with a nipple 88 connected to a copper conduit 89 extending along the rear axle housing and connecting with the lower nipple of wheel cylinder 90. The upper nipple of wheel cylinder 90, which corresponds to wheel cylinder 83, is connected to a flexible hose 91 leading to the adjacent end of a copper conduit 92 extending along one of the side members of the vehicle frame.

The forward end of the conduit 92 is connected with a flexible hose 93 leading to the lower nipple of a wheel cylinder 94 located at the right front wheel. Conduit 95 extends along the front axle of the vehicle and connects the upper nipple of wheel cylinder 94 with the lower nipple of wheel cylinder 96. The ends of conduit 95 must be flexible to accommodate the pivoting of the front wheels. Flexible hose 97 connects the upper nipple of wheel cylinder 96 with copper tube 98 which extends along one of the side members of the frame and connects with the nipple 68 which is screwed into one end of the valve member 21 as shown in Fig. 4.

As shown most clearly in Fig. 7, the wheel cylinder casting 84 is secured to supporting pan 37a by nuts 99 associated with the inlet and outlet nipples 82 and 88, respectively. The lower nipple is preferably made the inlet nipple and the upper nipple the outlet nipple, so that any air which may find its way into the cylinder will be discharged through the outlet nipple by the return movement of the wheel cylinder pistons under the influence of the retractile springs 46.

The operation of this embodiment of our invention is generally similar to the operation of the first embodiment. However, in the embodiment shown in Figs. 6 and 7, a second application of the brakes returns no fluid to the wheel cylinder from which it has just been discharged by the previous brake application, whereas, in the embodiment of Figs. 1 to 5, the small volume of fluid in each flexible hose is returned to the wheel cylinder from which it has just been discharged.

In Fig. 8 we have shown a wheel cylinder 83' which may be identical in all respects with the wheel cylinder 83. The wheel cylinder 83' is shown smaller than the wheel cylinder 83 but it should be understood that the wheel cylinder 83', like the wheel cylinder 83, may be made of any desired size. The wheel cylinder 83' comprises a casting 84' having a cylinder bore 85' in which is located the pistons 45' which may be of the type shown in Fig. 2 or of any other desired type. The cylinder casting 84' also provides passageways 86' and 87' which are indicated in the drawings as communicating with the cylinder bore at its uppermost and lowermost points, respectively.

In this figure the wheel cylinder 83' is shown as connected to a vehicle braking system of the type disclosed in United States Patent No. 1,841,614, of January 19, 1932, and wherein a single conduit conveys fluid under pressure from the master cylinder to the wheel cylinder and returns fluid discharged from the wheel cylinder to the master cylinder. The passageway 86' includes a threaded enlargement 100 into which is screwed a tubular nut 101 to which is attached, by means of a compression coupling or any other suitable device, a conduit 102 which leads to the master cylinder and forms the sole means by which fluid may be forced into or discharged from the cylinder 83'.

The tubular nut 101 has a tapered inner end which forms a fluid seal with the shoulder formed at the junction of the enlarged portion of the conduit 86' with the smaller portion thereof. The passageway 87' is similarly provided with an enlarged threaded portion 103 which is of the same size as the threaded portion 100 of the passageway 86'. This passageway is shown as closed by a bleed screw 104 which has a solid tapered inner end which seals against the shoulder formed between the enlarged and smaller portions of the passageway 87. By unscrewing the bleed screw 104 slightly, the tapered end of the bleed screw is withdrawn from sealing engagement with the shoulder in passageway 87', and thereupon air or fluid may escape through cross drill 105 and bore 106.

One great practical advantage of the type of wheel cylinder shown in Figs. 7 and 8 lies in the fact that the passageways 86, 87, 86' and 87' are identical and are symmetrically disposed with respect to the horizontal plane passing through the axis of the cylinder bore. This means that where this type of wheel cylinder is used in a system like that shown in Figs. 5 and 6, either passageway may be placed at the top and a single form of cylinder may be used for all of the vehicle wheels. Similarly, when this type of cylinder is connected up, as shown in Fig. 8, for use in a system of the type described in said Patent No. 1,841,614, or in a system of the type shown in Fig. 1 of this application, it is immaterial which side of the cylinder is up, and either passageway 86' or 87' may be made the upper passageway and connected to the bleed screw. In this manner it is possible to use a single form of cylinder for all types of installations instead of providing two or more forms of cylinders for use in certain types of installations as has heretofore been necessary.

This feature of the wheel cylinder shown in Figs. 7 and 8 is also of particular value where the wheel cylinders are of the two-diameter type shown in Fig. 9. The wheel cylinder of Fig. 9 has a large diameter 108, a smaller diameter 109 and identical passageways 110 and 111. This arrangement eliminates the necessity of providing right and left-hand wheel cylinder castings and makes it possible to use a single type of two-diameter wheel cylinder casting for all vehicle wheels.

Having thus described our invention, what we claim is new and desire to secure by Letters Patent of the United States is:

1. In a hydraulic brake system of the class described, the combination of a master cylinder, a fluid line having two ends, means connecting one of said ends with said master cylinder and including a valve for preventing flow of fluid from said master cylinder into said end, means connecting the other end of said line with said master cylinder and having a valve therein for preventing flow of fluid from said line to said master cylinder, means for operating said master cylinder to discharge fluid into said line, wheel cylinders connected in fluid communication with said line, and brake members actuated by said wheel cylinders.

2. In a hydraulic brake system of the class described, the combination of a master cylinder, a reservoir therefor, means for actuating said master cylinder to discharge fluid under pressure therefrom, a line having one end connected to said master cylinder and adapted to receive fluid therefrom, a valve in said end for preventing return flow of fluid from said line to said master cylinder, said line having a second end communicating with said cylinder, a valve in said second line preventing flow of fluid from said master cylinder into said line, wheel cylinders, a flexible connection between each wheel cylinder and said line, and brake members actuated by said wheel cylinders.

3. In a hydraulic brake system of the class described, the combination of a wheel cylinder, pistons reciprocable therein, a conduit for supplying fluid under pressure to said wheel cylinder to separate said pistons, brake members actuated by said pistons, normally inoperative means for forcing small quantities of fluid into said conduit under pressure to apply the brakes, a retractile spring for returning said pistons, a second conduit receiving fluid discharged from said cylinder, a second cylinder connected to said second conduit, pistons in said second cylinder, brake elements actuated by said pistons, a spring for returning said last-named pistons, a third conduit receiving fluid discharged from said second cylinder, and a reservoir in communication with said third conduit.

4. In a hydraulic system of the class described, the combination of a reservoir, a compression cylinder communicating therewith, a normally inoperative piston reciprocable in said cylinder, means for reciprocating said piston, a single conduit receiving all of the fluid discharged from said cylinder, a wheel cylinder connected to said conduit, pistons in said wheel cylinder, brake elements actuated by said pistons, means for returning said pistons, and a second conduit receiving the fluid discharged from said wheel cylinder, said second conduit communicating with said reservoir, said conduits being of great length relative to said compression cylinder and being separate and distinct throughout the greater portions of their lengths.

5. In a hydraulic system of the class described, the combination of a compression cylinder, a reservoir for said cylinder, a conduit connected to said cylinder, a valve preventing flow of fluid from said conduit to said cylinder, an actuating cylinder connected to said conduit, a piston reciprocably mounted in said actuating cylinder, means actuated by said piston, a second conduit connecting said cylinders, and a valve in said second conduit preventing flow of fluid from said first-mentioned cylinder to said conduit.

6. In a vehicle having a frame and front and rear wheels movable relative thereto, the combination of a fluid reservoir, a master cylinder communicating with said reservoir, a pipe line forming a circuit and attached to said frame, said pipe line having two ends, both of which communicate with said cylinder, a wheel cylinder located at each wheel of the vehicle, a flexible hose connecting each wheel cylinder with said pipe line, and braking means actuated by said wheel cylinders.

7. In a vehicle having a frame composed of side members and cross members and wheels movable relative to said frame, the combination of a fluid reservoir, a compression cylinder communicating therewith, means for intermittently actuating said cylinder, a fluid line extending along both of said frame members and across each end of said frame, means connecting said fluid line with said compression cylinder, a wheel cylinder at each vehicle wheel, said cylinders being located beneath said fluid line, a flexible hose extending in a generally upward direction and connecting each wheel cylinder with said fluid line, and brake members actuated by said wheel cylinders.

8. In a vehicle having a frame including side rails, axles movable relative to said frame, and wheels associated with said axles, the combination of a fluid reservoir, a fluid compressor, means for intermittently actuating said compressor, said compressor being connected to said reservoir, a conduit receiving fluid discharged from said compressor and extending along one of said side rails, a wheel cylinder located at one of the vehicle wheels, a flexible hose connecting said conduit with said wheel cylinder, a second conduit connected to said wheel cylinder, a second wheel cylinder located at the opposite wheel, said second conduit connected to said second wheel cylinder and extending along the axle connecting said wheels, a second flexible hose connected to said second wheel cylinder, a third conduit extending along the vehicle frame and leading back to said compressor, said second hose connected to said third conduit, and brake mechanism actuated by said wheel cylinders.

9. In a hydraulic brake system, the combination of a compressor and reservoir unit, a circulatory fluid line having one end connected with said unit to receive fluid therefrom and a second end connected to said unit to return fluid thereto, wheel cylinders connected to said fluid line at intervals spaced therealong, brake mechanism actuated by said wheel cylinders, and means for operating said compressor only during periods of brake application.

10. In a fluid system of the class described, the combination of a fluid compressor, means for actuating said compressor, a circulatory fluid line having one end connected with said compressor to receive all fluid discharged therefrom and a second end connected with said compressor to return fluid thereto, said pipe line being of great length relative to said compressor, an expansible chamber, means actuated by said expansible chamber, a conduit connecting said expansible chamber with said fluid line, said conduit having a fluid capacity less than the volumetric change of said chamber, and a reservoir connected to said fluid compressor.

11. In hydraulic brake mechanism of the class described, the combination of a reservoir, a fluid compressor communicating therewith, means for actuating said fluid compressor, a conduit receiving at spaced intervals fluid discharged by said compressor, a wheel cylinder connected to said conduit, pistons reciprocably mounted in said wheel cylinder, a second conduit receiving the fluid discharged from said cylinder by return movement of said pistons, said second conduit being of copper, means for returning said pistons, and brake mechanism actuated by said pistons.

12. In mechanism of the class described, the combination of a wheel cylinder having a cylinder bore, a passageway connected to the top of said bore, means for supplying fluid to said cylinder bore through said passageway, a bleed passageway communicating with said cylinder bore at a point below the point of communication between said first-named passageway and said cylinder bore, means normally closing said bleed passageway, pistons reciprocably mounted in said cylinder, and brake means actuated by said pistons.

13. In mechanism of the class described, the combination of a cylinder having a bore therein, pistons reciprocably mounted in said bore, said pistons having plane faces and being provided with annular grooves spaced from said faces, sealing means in said grooves, brake members connected to said pistons, means normally holding said pistons with their plane faces in engagement, and means for supplying liquid under pressure to said cylinder.

14. In mechanism of the class described, the combination of a fluid compressor part, a reservoir part, said compressor part communicating with said reservoir part, a conduit connected to said compressor and receiving the fluid discharged therefrom, an actuating cylinder having a single fluid chamber, an inlet passageway communicating with the lower portion of said chamber, a connection between said conduit and said inlet passageway, an outlet passageway communicating with the upper portion of said chamber, a second conduit connected to said outlet passageway and communicating with one of said parts, a piston in said cylinder chamber, valve means preventing reverse flow through said inlet and outlet passages and a brake element actuated by said piston.

15. In mechanism of the class described, the combination of a fluid compressor, a wheel cylinder having a single fluid chamber, inlet and outlet passageways communicating with lower and upper portions of said chamber, respectively, said passageways lying in the same vertical plane, means connecting said passageways with said fluid compressor, means preventing reverse flow through said inlet and outlet passages, pistons in said wheel cylinder, brake mechanism actuated by said pistons, a reservoir communicating with said fluid compressor, and means for actuating said fluid compressor.

16. In a hydraulic brake system of the class described, the combination of a fluid reservoir, a fluid compressor communicating therewith, means, including a pedal, for actuating said fluid compressor, wheel cylinders mounted for movement relative to said compressor, a metallic pipe line having two ends, both of said ends being connected to said compressor, flexible rubber hoses connecting said wheel cylinders with said metallic pipe line, and means actuated by said wheel cylinders.

17. In an automotive vehicle having a frame and wheels movable relative to said frame, the combination of a reservoir, a fluid compressor supplied from said reservoir, means mounting said compressor and reservoir on said frame, a brake pedal and connections for actuating said compressor, a pipe line forming a closed loop about said frame and having two ends, both of which are connected to said compressor, wheel cylinders mounted at the vehicle wheels, pistons in said wheel cylinders, a brake drum associated with each wheel, brake shoes moved by said pistons into engagement with said brake drums, retractile springs for returning said brake shoes and pistons, each wheel cylinder receiving an additional volume of fluid upon each application of the brakes, said additional volume of fluid being discharged by each wheel cylinder upon release of the brakes, and flexible connections between said wheel cylinders and said pipe line, each flexible connection having a fluid capacity less than said additional volume.

18. In a hydraulic system, the combination of a fluid compressor, a loop-shaped pipe line connected to said compressor and adapted to receive all fluid discharged therefrom, said pipe line being of great length relative to said compressor, means for operating said compressor to discharge fluid into said pipe line, a branch pipe line capable of holding only a relatively small volume of fluid, an actuating cylinder connected to said branch line, a piston reciprocable in said actuating cylinder, said cylinder capable of holding a relatively large volume of fluid when said piston is in one of its positions, means actuated by said piston, and means for returning said piston.

19. In a hydraulic system of the class described, the combination of a fluid compressor, means to operate said compressor intermittently, a first actuating cylinder, a conduit connecting said compressor and said cylinder, said conduit receiving fluid discharged from said compressor and conveying said fluid toward said actuating cylinder, a piston in said actuating cylinder moved to extended position by fluid forced into said cylinder by said compressor, means actuated by such movement of said piston, means for returning said piston, a second conduit in communication with said actuating cylinder, a second actuating cylinder connected to said second conduit, said second conduit receiving fluid discharged from said first-mentioned actuating cylinder by return of the piston therein and conveying said fluid toward said second actuating cylinder, a piston in said second actuating cylinder, means operated by said last-named piston, means for returning said last-named piston, and a third conduit communicating with said second actuating cylinder for receiving fluid discharged therefrom and conveying said fluid toward said compressor.

20. In a hydraulic brake system, the combination of a wheel cylinder having a cylinder bore and identical passageways communicating with said cylinder bore at its uppermost and lowermost points, piston means reciprocable in said bore, a bleed screw associated with and normally closing the passageway communicating with the uppermost point of said cylinder bore, and conduit means connected to the passageway communicating with the lowermost point of said cylinder bore.

21. In a motor cylinder of the class described, the combination of means providing a cylinder bore and identical passageways communicating with said bore at points equally spaced in a vertical plane from the axis of said bore, bleeding means normally closing one of said passageways, and conduit means connected to the other of said passageways and through which fluid under pressure is supplied to said cylinder.

22. In hydraulic brake mechanism of the class described, the combination of supply means including a fluid reservoir and a fluid compressor supplied therefrom, operator controlled means for actuating said fluid compressor, a conduit receiving the fluid discharged by said compressor, a fluid motor connected to said conduit, brake mechanism actuated by said motor, a second conduit receiving the fluid discharged from said motor and returning said fluid to said supply means, and means other than said reservoir for maintaining the fluid in said conduits and motor under superatmospheric pressure between operating intervals of said compressor.

23. In brake mechanism of the class described, the combination of a supply unit comprising a reservoir and fluid compressor, means for actuating said fluid compressor at spaced intervals, a single conduit receiving all fluid discharged by said compressor, a motor cylinder connected to said conduit, a piston reciprocably mounted in said motor cylinder, brake mechanism operated by said piston, a second conduit receiving the fluid discharged from said cylinder by return movement of said piston, said second conduit returning said fluid to said unit, said conduits being of great length relative to said supply unit and being separate and distinct throughout the greater portions of their lengths, and means for maintaining said conduits and motor cylinder completely filled with fluid while said compressor is idle.

WALLACE F. OLIVER.
HERBERT C. BOWEN.
ERWIN F. LOWEKE.